(12) United States Patent
Dassano et al.

(10) Patent No.: US 10,069,201 B2
(45) Date of Patent: Sep. 4, 2018

(54) MULTIPLE-FREQUENCY ANTENNA FOR A SYSTEM OF VEHICLE TYRE SENSORS

(75) Inventors: Gianluca Dassano, Turin (IT); Mario Orefice, Turin (IT); Guillermo Vietti, Turin (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 13/996,750

(22) PCT Filed: Dec. 29, 2011

(86) PCT No.: PCT/EP2011/074210
§ 371 (c)(1),
(2), (4) Date: Jun. 21, 2013

(87) PCT Pub. No.: WO2012/089799
PCT Pub. Date: Jul. 5, 2012

(65) Prior Publication Data
US 2013/0278467 A1    Oct. 24, 2013

Related U.S. Application Data

(60) Provisional application No. 61/470,602, filed on Apr. 1, 2011.

(30) Foreign Application Priority Data

Dec. 30, 2010    (IT) .............................. MI2010A2465

(51) Int. Cl.
*H01Q 1/32*    (2006.01)
*H01Q 5/00*    (2015.01)
(Continued)

(52) U.S. Cl.
CPC ....... *H01Q 5/0027* (2013.01); *B60C 23/0433* (2013.01); *B60C 23/0452* (2013.01);
(Continued)

(58) Field of Classification Search
CPC ..... H01Q 1/2241; H01Q 1/3291; H01Q 1/325
(Continued)

(56) References Cited

U.S. PATENT DOCUMENTS

2001/0045908 A1    11/2001 Keilen
2008/0001842 A1*    1/2008 Shigihara ............. H01Q 1/2241
                                                            343/872
(Continued)

FOREIGN PATENT DOCUMENTS

WO    WO 2009/081425    7/2009

OTHER PUBLICATIONS

Guo, Y. X. et al., "Regular Circular and Compact Semicircular Patch Antennas with a T-Probe Feeding," Microwave and Optical Technology Letters, vol. 31, No. 1, pp. 68-71 (2001).
(Continued)

*Primary Examiner* — Dameon E Levi
*Assistant Examiner* — Collin Dawkins
(74) *Attorney, Agent, or Firm* — Finnegan, Henderson, Farabow, Garrett & Dunner, L.L.P.

(57) ABSTRACT

A system includes a sensor device adapted to be associated with a tyre of a vehicle, and a sensor coordinator device adapted to be installed on a body of the vehicle. The sensor coordinator device includes an antenna. The antenna includes a single-piece metallic plate shaped so as to define a first plate portion designed for the wireless reception of data from the sensor device in a first frequency band, and a second plate portion designed for the wireless transmission of data to the sensor device in a second frequency band different from the first frequency band. The antenna further includes a ground plate common to both the first and second plate portions.

10 Claims, 13 Drawing Sheets

(51) Int. Cl.
*B60C 23/04* (2006.01)
*H01Q 1/22* (2006.01)
*H01Q 1/38* (2006.01)
*H01Q 9/04* (2006.01)
*H01Q 5/307* (2015.01)

(52) U.S. Cl.
CPC ....... *B60C 23/0462* (2013.01); *H01Q 1/2241* (2013.01); *H01Q 1/3233* (2013.01); *H01Q 1/38* (2013.01); *H01Q 5/307* (2015.01); *H01Q 9/0407* (2013.01); *H01Q 9/0414* (2013.01); *H01Q 9/0421* (2013.01)

(58) Field of Classification Search
USPC .................................. 343/711, 713, 700 MS
See application file for complete search history.

(56) References Cited

U.S. PATENT DOCUMENTS

| | | | | |
|---|---|---|---|---|
| 2008/0136734 | A1* | 6/2008 | Manholm | H01Q 9/0414 |
| | | | | 343/893 |
| 2008/0266179 | A1* | 10/2008 | Sotoudeh | H01Q 1/243 |
| | | | | 343/700 MS |
| 2009/0115664 | A1* | 5/2009 | Chung | H01Q 1/243 |
| | | | | 343/700 MS |
| 2009/0128422 | A1* | 5/2009 | Koshiji | H01Q 9/285 |
| | | | | 343/700 R |
| 2009/0289852 | A1* | 11/2009 | Li | H01Q 1/3291 |
| | | | | 343/700 MS |
| 2009/0295643 | A1* | 12/2009 | Angell | H01Q 5/35 |
| | | | | 343/700 MS |
| 2009/0320580 | A1* | 12/2009 | Mancosu | B60C 23/0493 |
| | | | | 73/146 |
| 2010/0097203 | A1 | 4/2010 | Chen et al. | |
| 2010/0277376 | A1* | 11/2010 | Chakam | H01Q 1/3241 |
| | | | | 343/702 |
| 2011/0159817 | A1 | 6/2011 | Sabatini et al. | |
| 2011/0163934 | A1* | 7/2011 | Tseng | H01Q 9/42 |
| | | | | 343/846 |
| 2011/0221644 | A1* | 9/2011 | Lee | H01Q 9/0421 |
| | | | | 343/770 |

OTHER PUBLICATIONS

Rowell, C. R. et al, "A Compact PIFA Suitable for Dual-Frequency 900/1800-MHz Operation," IEEE Transactions on Antennas and Propagation, vol. 46, No. 4, pp. 596-598 (1998).

International Search Report from the European Patent Office for International Application No. PCT/EP2011/074210, dated Apr. 5, 2012.

Written Opinion of the International Searching Authority for International Application No. PCT/EP2011/074210, dated Apr. 5, 2012.

Wong, K. L. et al., "Thin Internal GSM/DCS Patch Antenna for Mobile Phones," Antennas and Propagation Society International Symposium 2006, IEEE, Albuquerque, NM, USA, pp. 4725-4728, XP010944989, (2006).

Wong, K. L. et al., "Thin Internal GSM/DCS Patch Antenna for a Portable Mobile Terminal," IEEE Transactions on Antennas and Propagation, vol. 54, No. 1, pp. 238-242, XP-001240079, (2006).

* cited by examiner

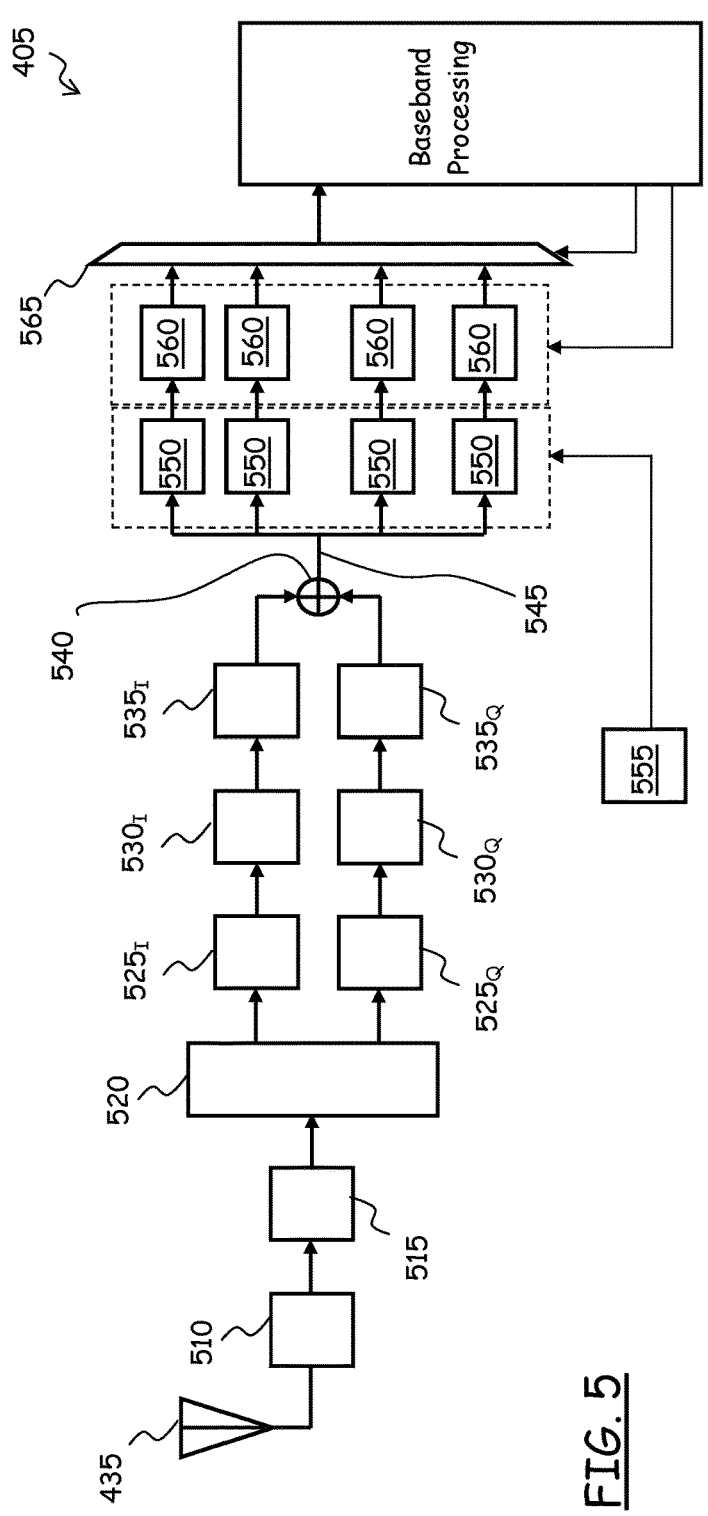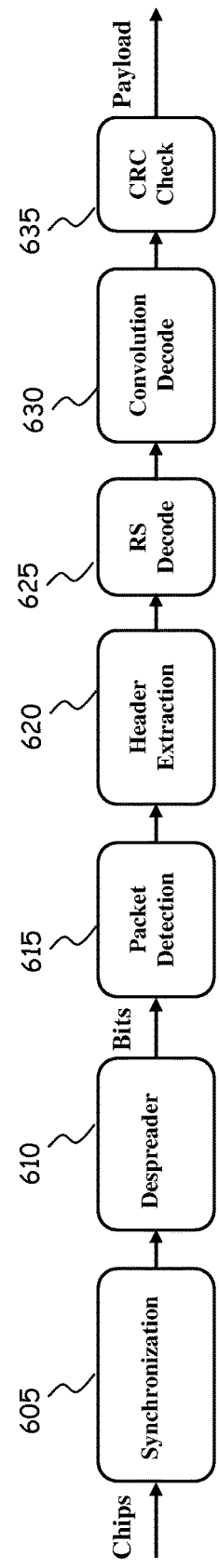

MULTIPLE-FREQUENCY ANTENNA FOR A SYSTEM OF VEHICLE TYRE SENSORS

CROSS REFERENCE TO RELATED APPLICATIONS

This application is a national phase application based on PCT/EP2011/074210, filed Dec. 29, 2011, and claims the priority of Italian Patent Application No. MI2010A002465, filed Dec. 30, 2010, and the benefit of U.S. Provisional Application No. 61/470,602, filed Apr. 1, 2011, the content of each application being incorporated herein by reference.

BACKGROUND OF THE INVENTION

Field of the Invention

The present invention relates to the field of the vehicle tyre sensors. Specifically, the present invention relates to an antenna configured to be exploited in a system of vehicle tyre sensors.

Description of the Related Art

The incorporation of electronic devices within pneumatic tyres is taking a greater importance in order to increase the safety of vehicles. Tyre electronics may include sensors and other components suitable for obtaining information regarding the behavior of a tyre, as well as various physical parameters thereof, such as for example temperature, pressure, number of tyre revolutions, vehicle speed, etc.

Such information may become useful in tyre monitoring and/or alarm systems.

Furthermore, active control/safety systems of the vehicle may be based on information sent from sensor devices included within the tyres.

Active safety systems use information about the external environment of a vehicle to change its behavior in pre-crash time period or during the crash event, with the ultimate goal of avoiding a crash altogether. Initially, active safety systems were primarily focused on improving the vehicle longitudinal motion dynamics, in particular, on more effective braking Anti-lock Braking Systems (ABS) and Traction Control (TC) systems. TC systems prevent the wheel from slipping while improving vehicle stability and steerability by maximizing the traction and lateral forces between the vehicle's tyre and the road. These systems were followed by more powerful vehicle stability control systems, e.g., Electronic Stability Program (ESP), Vehicle Stability Control (VSC), and Dynamic Stability Control (DSC). These latter systems use both brakes and engine torque to stabilize the vehicle in extreme handling situations by controlling the yaw motion. Active suspension systems are also an important part in vehicle active safety systems. They have been traditionally designed by trading-off three conflicting criteria: road holding, load carrying and passenger comfort. The suspension system has to support the vehicle, provide directional control during handling maneuvers and provide effective isolation of passengers/payload from road disturbances.

The active safety control systems described above are based upon the estimation of vehicle dynamics variables such as forces, load transfer, tire-road friction. The more accurate and "real time" the parameter estimation, the better the overall performance of the control system. Currently, most of these variables are indirectly estimated using on-board sensors, and are not very accurate. Using measurements made by sensors fitted on the vehicle tyres would provide far more accurate estimation of the parameters relevant to the vehicle dynamics.

Setting up a system based on sensors fitted on the vehicle tyres is however a challenging task, for several reasons.

The inside of a tire is a harsh environment experiencing high accelerations, and cannot be reached without taking the tire off the wheel. This situation poses very difficult problems: the high centrifugal acceleration implies that the sensor be light weight, for example not to unbalance the tyre, robust and small.

The fact that the tyre moves continuously with respect to the body of the vehicle forces to choose a wireless communication link for the communications from/to the sensors. However, the communication environment in which the sensor devices and the receiver are located is very harsh: in the immediate vicinity of a sensor device the wheel rim and the wheel arch of the car's body form two large signal reflectors. Both these parts are typically in metal and are curved in such a way that they tend to reflect incident waves back into the area, confining them. Furthermore, the radius of curvature of these two vehicle parts is of the order of the wavelength used for wireless transmission, making reflections much more complex. Also, the sensor device is inside the tyre and has to transmit through the tyre in some way: a true line of sight communication channel cannot be achieved since the tyre, being composed of a metal mesh and rubber, attenuates the signal dramatically.

Another issue is connected to the sensors' power supply; replacing the sensors' batteries is impractical because of the difficulty of reaching inside the tire. Hence, it is of primary importance that the sensor devices power consumption be as low as possible.

As disclosed in the U.S. patent application Ser. No. 12/654,705 filed on 29 Dec. 2009 and assigned to one of the present Applicants, herein incorporated by reference, some of the above issues can be solved by adopting a communication between sensor nodes fitted on vehicles' tyres and a sensor coordinator device fitted in the body of the vehicle exploiting Ultra Wide Band (UWB) transmission for the uplink (from the sensor nodes to the coordinator) and a narrowband transmission—such as one of the so called Industrial Scientific and Medical (ISM) radio bands—for the downlink (from the coordinator to the sensor nodes). The adoption of such communication scheme is advantageous because it allows to exploit the advantages of the UWB transmission for the uplink and at the same time the advantages of the ISM transmission for the downlink. Specifically, UWB is a technology suitable for low-cost, low-power, short-range and high-throughput wireless data transmission, which is robust against inter-symbol interference due to multi-path interference and lack of line-of-sight communications. Moreover, ISM transmission allows to strongly reduce the power consumption at the receiver side (sensor node) for the downlink, guaranteeing at the same time a sufficient throughput (which, in the downlink case, is relatively low).

Thus, by employing the solution proposed in such patent application, each sensor coordinator device, and each sensor node as well, need to be equipped with proper antennas, capable of transmitting and receiving both in the UWB band and in the ISM band.

Making reference in particular to the sensor coordinator devices, the system would be equipped with a pair of different antennas, one for receiving in the UWB band and one for transmitting in the ISM band. Said antennas should be carefully designed in such a way to fulfill the requirements imposed by the particular environment wherein they have to operate, such as being sufficiently compact and capable of exhibiting good performances, especially from the bandwidth point of view, even in presence of metallic elements included in the sensor coordinator devices themselves.

In order to reduce the area occupation of the antenna system, each coordinator device may be equipped with a single antenna, both for receiving in the UWB band and for transmitting in the ISM band; in this case, the antenna is referred to as "multiple-frequency antenna".

Many types of multiple-frequency antennas can be found in the literature. Usually they are made with stacked patches on different layers, resonant ad different frequencies, or with complex shapes, including notches, slots, etc. To fulfill the compactness requirement, one of the most common patch antenna configurations is the planar inverted F antenna (PIFA), widely used in wireless terminals because of its small size for multiband applications. Examples of known multiple-frequency PIFAs are disclosed in "Thin internal GSM/DCS Patch Antenna for a Portable Mobile Terminal" by Kin-Lu Wong, Yuan-Chih Lin, and Ting-Chih Tseng, *IEEE Transactions on antennas and propagation,* vol. 54, No. 1, January 2006 and in "A compact PIFA suitable for Dual-Frequency 900/1800-MHz Operation" by Corbett R. Rowell and R. D. Murch, *IEEE Transactions on antennas and propagation,* vol. 46, No. 4, April 1998.

A further known PIFA is disclosed in "Regular circular and compact semicircular patch antennas with a T-probe feeding" by Y. X. Guo, K. M. Luk, and K. F. Lee, *Microwave and optical technology letters,* Vol. 31, No. 1., Oct. 5, 2001.

SUMMARY OF THE INVENTION

It has been found that a particularly compact multi-frequency antenna exhibiting good efficiency, low directivity and good coverage angle can be obtained by providing a single-piece metallic plate shaped in portions designed to operate at different frequencies. It has also been found that this antenna can be effectively adapted to operate in the above mentioned frequency bands of interest of a system of vehicle tyre sensors.

According to an aspect of the present invention, there is provided a system comprising a sensor device adapted to be associated with a tyre of a vehicle, and a sensor coordinator device adapted to be installed on a body of the vehicle. The sensor coordinator device includes an antenna. The antenna comprises a single-piece metallic plate shaped so as to define a first plate portion designed for the wireless reception of data from the sensor device in a first frequency band, and a second plate portion designed for the wireless transmission of data to the sensor device in a second frequency band; the second frequency band is different than the first frequency band. The antenna further comprises a ground plate common to both the first and second plate portions.

Said first and second plate portions may be located on a first face of a layer of a dielectric material.

The metallic ground plane may be advantageously located on a second face of said layer of dielectric material opposite to said first face.

According to an embodiment of the present invention, the antenna further comprises a conductive ground element configured to connect the first and second plate portions with the metallic ground plane. The conductive ground element crosses the thickness of the layer of dielectric material from the first face to the second face thereof.

According to a further embodiment of the present invention, the antenna may further include a further layer of a dielectric material having a first face covering the first and second plate portions and the first face of the layer of dielectric material. Moreover, the antenna may further includes an additional single-piece metallic plate shaped so as to define a first additional plate portion and a second additional plate portion located on a second face of the further layer of dielectric material opposite to said first face of said further dielectric material. In this way, the first additional plate portion is located above the first plate portion and the second additional plate portion is located above the second plate portion.

Said first and second additional plate portions may have substantially the same shape of the first and second plate portions, respectively.

Advantageously, said conductive ground element may be further configured to connect the first and second additional plate portions with the ground plate; the conductive ground element may further cross the thickness of the further layer of dielectric material from the first face to the second face thereof.

According to a preferred embodiment of the present invention, said first plate portion further includes a protruding metallic stub.

According to an embodiment of the present invention said first frequency band is centered around a central frequency comprised between 4.2 and 4.8 GHz, and said second frequency band is centered around a central frequency comprised between 2.4 and 2.5 GHz.

Another aspect of the present invention relates to an antenna comprising a single-piece metallic plate shaped so as to define a first plate portion designed for the wireless reception/transmission of data in a first frequency band, and a second plate portion designed for the wireless transmission/reception of data in a second frequency band different than the first frequency band; said antenna includes a ground plate common to both the first and second plate portions.

BRIEF DESCRIPTION OF THE DRAWINGS

These and other features and advantages of the present invention will be made evident by the following description of some exemplary and non-limitative embodiments thereof, to be read in conjunction with the attached drawings, wherein:

FIG. 5 is a functional block diagram of an analog front-end of a UWB receiver on a coordinator device;

FIG. 6 is a functional block diagram of a digital baseband processing section of the UWB receiver in the coordinator device;

DETAILED DESCRIPTION OF EXEMPLARY EMBODIMENTS OF THE INVENTION

Figure 1:
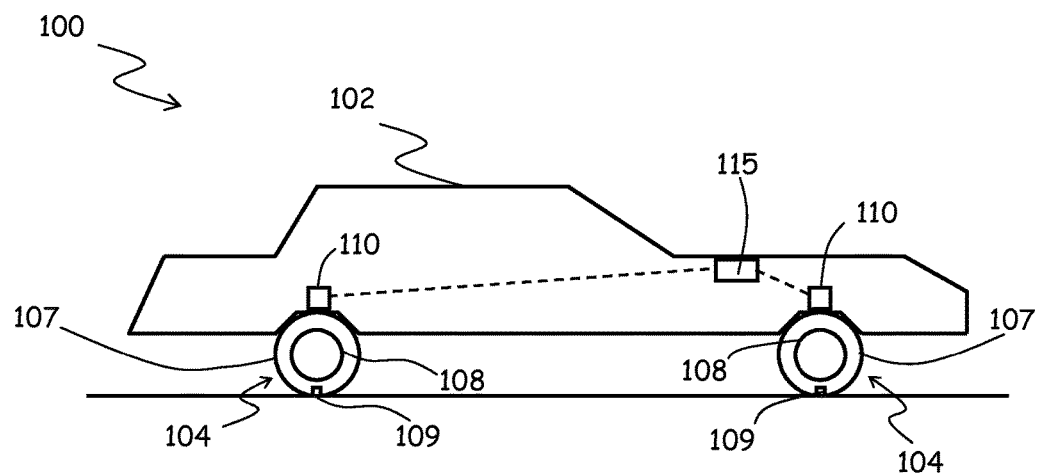
FIG. 1 schematically shows a possible architecture of a system of tyre sensors.

Making reference to the drawings, in FIG. 1 there is schematically shown an architecture 100 of a system of tyre sensors whose sensor nodes can be equipped with an antenna according to an embodiment of the present invention. For example, the system of tyre sensors illustrated in FIG. 1 may be the one disclosed in the already cited U.S. patent application Ser. No. 12/654,705. FIG. 1 schematically shows a generic vehicle, identified with the reference 102, which is equipped with wheels 104 each having a tyre 107 fitted on a respective rim 108.

The main components of the system are organized in a hierarchical manner in a Personal Area Network (PAN) defined as a collection of associated and cooperating devices.

At the lowest hierarchical level, the tyre sensor devices are comprised in sensor nodes 109, located within the wheels 104—for example, inside the tyres 107—, that are responsible for data acquisition, processing and transmission to the in-vehicle equipment. The sensor devices can be accelerometers, and/or strain gauges, and/or pressure sensors, and/or temperature sensors.

Typically, a vehicle tyre comprises an internally hollow toroidal structure formed by a plurality of components, primarily by a carcass, terminating in two beads, each formed along an inner circumferential edge of the carcass, for securing the tyre to a corresponding supporting rim. At least one pair of annular reinforcing cores, called bead cores, are inserted in the said beads. The carcass is a supporting structure formed by at least one reinforcing ply which includes textile or metallic cords, axially extending from one bead to the other according to a toroidal profile, the ends of which are associated with a corresponding bead core. In radial tyres, the aforesaid cords lie essentially in planes containing the axis of rotation of the tyre. In a radially external position to the carcass, an annular structure is placed, known as belt structure, typically comprising one or more strips of rubberized fabric including metallic cords, wound on top of each other. A tread is also added, wound around the belt structure, and usually molded with a relief pattern for the rolling contact of the tyre with the road. Two sidewalls, each extending outwards in radial direction from the outer edge of the corresponding bead, are also placed on the carcass, in axially opposed positions. In tubeless tyres the inner surface of the carcass is normally covered with at least one liner layer, i.e. with one or more layers of airtight elastomeric material. The tyre may further comprise other known elements, such as edges, strips and fillers, according to the specific design of the tyre.

The sensor node 109 is preferably placed on the internal surface of the tyre 107, for example on the inner liner surface thereof. Alternatively, the sensor node 109 may be placed on different portions of the tyre 107, or even on the surface of the rim 108 which is in contact with the tyre 107.

Figure 2:
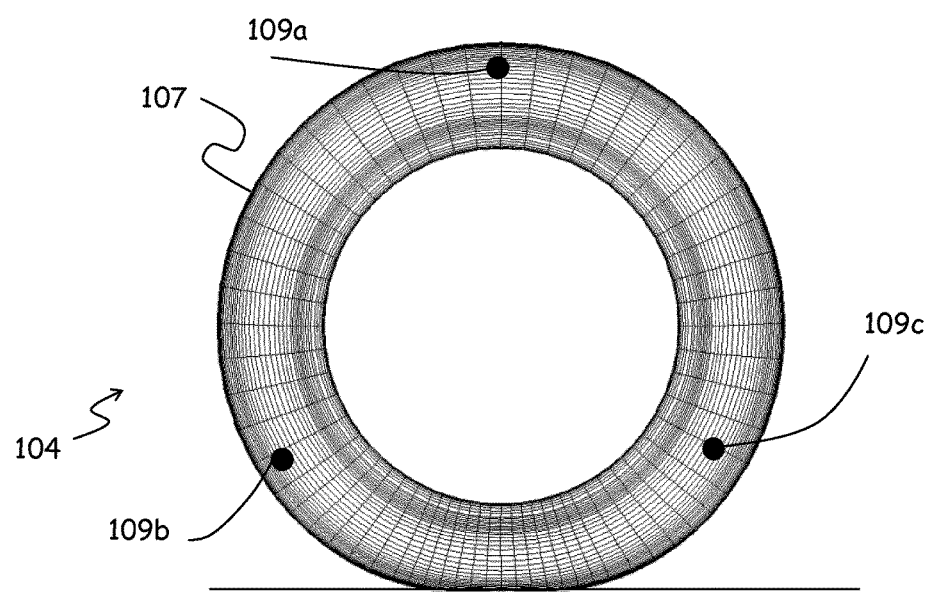
FIG. 2 schematically shows an equatorial section of a tyre having three sensor devices disposed on the liner internal surface.

One or more sensor nodes may be placed inside each tyre, to increase the accuracy and reliability of the measurements performed. For example three sensors nodes 109a, 109b, 109c may be located at an angle of 120° with respect to each other, as depicted in FIG. 2. This configuration allows improving the knowledge of spatial variation of tire/road interaction parameters. Preferably, the sensor nodes 109a, 109b, 109c are located substantially on the equatorial plane of the tyre. Alternatively or in combination, in an embodiment not shown in the figures, a plurality of sensor nodes can be disposed substantially on the same meridian (or radial) plane of the tyre, with at least one of the sensor nodes located out of the equatorial plane of the tire. This configuration allows improving the knowledge of the tyre/road interaction along the whole width of the tyre footprint (i.e. of the contact region between the tyre and the road), as well as making comparisons between the measurements performed by the different sensors located substantially on the same meridian plane in order to derive information during particular maneuvers performed by the vehicle (e.g. load transfer during a bend, drift angle etc.).

Referring back to FIG. 1, at an upper level in the PAN hierarchy, one or more PAN coordinators 110 are mounted in the vehicle body. The PAN coordinators 110 are preferably powered by the vehicle main power supply; each PAN coordinator 110 is associated with, and mounted preferably in proximity of a respective vehicle tyre 107, and manages the communication with the sensor nodes 109 in the associated tyre, receiving data from them, and mastering the synchronization of the sensor nodes' transmissions. Having one PAN coordinator 110 associated with each tyre, instead of a single, common PAN coordinator for all the tyres, allows increasing the total throughput by limiting the number of sensors controlled by each coordinator and minimizing the distance between the sensor nodes 109 and the PAN coordinator 110, for a more robust communication between these devices.

The PAN coordinators 110 can be connected to each other via a wired network, possibly exploiting a vehicle system bus such as CAN (Controller Area Network) and FlexRay.

At the highest level of the PAN hierarchy is a system control host 115, a device responsible for coordinating all PAN coordinators 110, interfacing them with the vehicle main control and providing a bridge to the vehicle system bus. The system control host 115 is responsible for transferring commands to the sensor nodes from the vehicle main control system and information acquired by the PAN coordinators 110 to the vehicle main control system via the vehicle system bus. The system control host 115 may be implemented as one of the PAN coordinators 110, having enhanced functions with respect to other PAN coordinators.

The PAN architecture has a cluster tree structure. A cluster tree structure is suitable since sensor nodes 109 do not need to communicate with each other but only with the respective PAN coordinator 110.

In order to comply with the several different and sometimes conflicting requirements mentioned in the foregoing, the system of tyre sensors provides for employing different radio technologies for the communications between the generic sensor node 109 and the respective PAN coordinator 110 in uplink (i.e., from the sensor node 109 to the PAN coordinator 110) and downlink (i.e., from the PAN coordinator 110 to the sensor node 109).

As discussed in the foregoing, the communication environment in the PAN of FIG. 1, particularly between the sensor nodes 109 and the PAN coordinator 110, is very harsh. On the other hand, a large amount of data needs to be transmitted in uplink, thus transmission at a fairly high data rate, greater than 1 Mbit/s, should be possible; at the same time, the power consumption should be as little as possible, due to the power supply limitations at the sensor nodes.

Thus, for the uplink transmission, i.e. for the transmission from the sensor node 109 to the PAN coordinator 110, Ultra-Wide-Band (UWB) transmission is adopted.

UWB is a technology that is suitable for low-cost, low-power, short-range wireless data transmission. UWB transmission is robust against inter-symbol interference due to multi-path interference, even severe, and lack of line-of-sight communications. In addition to this, UWB transmission hides signals below the noise floor causing little or no interference to existing systems and mitigates the performance degradation due to narrow-band interference. Low power consumption is achieved thanks to the fact that high power pulses (the power needs to be sufficiently high for the pulses to emerge from the noise floor) are transmitted but using a low duty cycle, so that the average transmitted power remains low.

Two broad categories of UWB radio systems are known in the art: Impulse Radio (IR) and Multi-Band Orthogonal Frequency-Division Multiplexing (MB-OFDM). IR systems directly generate the UWB frequency spectrum via ultra-short pulses, whereas MB-OFDM is an adaptation of traditional narrowband OFDM technology that forms an aggregate equivalent bandwidth of at least 500 MHz.

The United States Federal Communications Commission (FCC) and the International Telecommunication Union-Telecommunication Standardization Sector (ITU-T) define UWB as any radio technology for which the emitted signal bandwidth exceeds the lesser of 500 MHz and 20% of the center frequency of the modulating signal that forms the pulse, in case of IR, or of the carrier wave in case of OFDM. In 2002, FCC has allocated the 3.1-10.6 GHz band for the unlicensed use of UWB applications; however, these unlicensed UWB systems have to limit energy emission to follow an FCC-defined spectral mask, so that no interference is caused to other existing technologies in the band; in particular, a limit of −41 dBm/MHz on the whole 3.1-10.6 GHz band is set for most devices making use of UWB technology. Conceptually similar energy emission limits in defined spectral masks have been adopted in Europe and in other Countries of the world, although differences exist in the shape of the spectral mask and in the values of the emission limits; for example, in the European Union a maximum mean e.i.r.p. (Equivalent Isotropic Radiated Power) density of −41.3 dBm/MHz is allowed in the 3.4-4.8 GHz band, provided that a low duty cycle limit is satisfied. In Japan, the allowed frequency bands are 3.4-4.8 GHz and 7.25-10.25 GHz.

Choosing to operate in the frequency band 4.2-4.8 GHz is advantageous, because in this way it is possible to comply with the current different regulations.

IR UWB technology is better suited to be used for the uplink communications between the sensor nodes 109 and the PAN coordinators 110, thanks to the simple architecture of the uplink transmitter (the part that resides on the sensor nodes 109), which enables low-power high data rate uplink transmission from the sensor nodes 109 to the PAN coordinators 110 on the vehicle.

In IR UWB, the main pulse is first generated, whose frequency response fits in the baseband equivalent of the FCC spectral mask (or corresponding masks defined by other regulatory authorities in different Countries). The pulse is then up-converted to the desired carrier frequency, obtaining an amplitude modulated RF signal, whose envelope is the shape of the pulse.

Any pulse shape can in principle be used for UWB systems, provided that the frequency response satisfies the energy emission limits. Possible pulse shapes for IR UWB systems are Gaussian pulses and their ($1^{st}$ or $2^{nd}$) derivatives:

$$x(t) = \frac{A}{\sqrt{2\pi}\,\sigma} \exp\left(-\frac{t^2}{2\sigma^2}\right)$$

where A is the amplitude, and σ controls the pulse length.

The frequency spectra of these pulses have a good behavior compared to other pulse shapes. However such pulses are quite difficult to generate and/or control, and a sophisticated transmission-line based design would be required; the center frequency of a Gaussian pulse is also hard to control, since even the slightest change in pulse shape, of the order of picoseconds, can shift the center frequency by hundreds of MHz. In addition, generating Gaussian pulses that fit in the FCC (or equivalent) spectral mask is not trivial; some filtering would be needed for the pulse, but this would increase the transmitter complexity, whereas in order to reduce power consumption and size, the uplink transmitter on the sensor node 109 should be as simple as possible.

Figure 3:
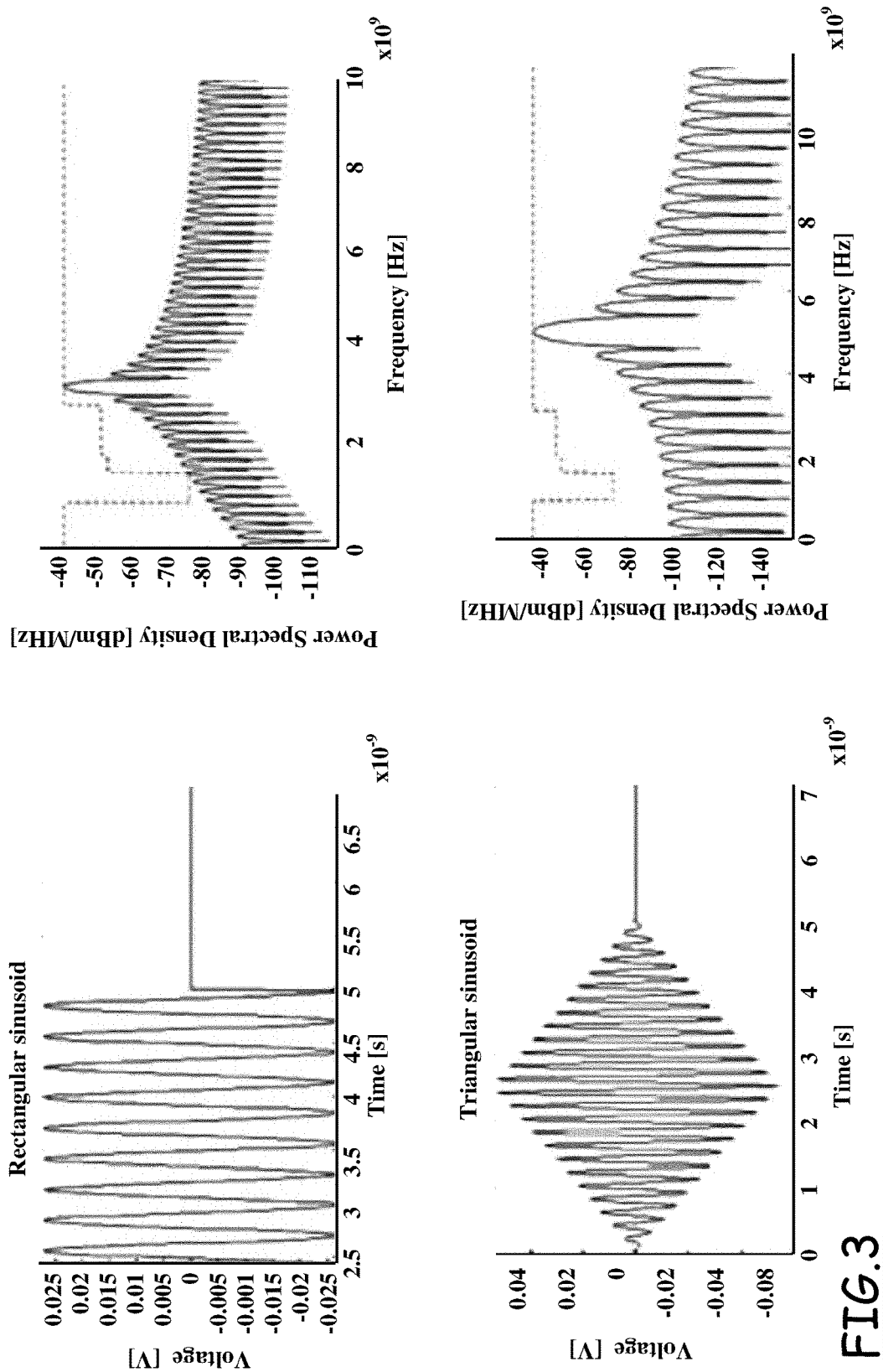
FIG. 3 depicts comparative time-domain and frequency-domain diagrams of a rectangular sinusoid pulse and of a triangular sinusoid pulse usable in an IR UWB transmission scheme.

Other possible pulse shapes are rectangular and triangular. Pulses having a rectangular and triangular shape can be generated without the need of filters or other hardware, and their center frequency is easy to control. Moreover, the pulses having a triangular shape better fit in the FCC spectral mask and offers more bandwidth in the main lobe of the frequency response, as depicted in FIG. 3, where a comparison is provided between the time and frequency domain of rectangular envelope pulses (upper diagrams in the figure) and triangular envelope pulses (lower diagram in the figure).

For the downlink communications between the PAN coordinators 110 and the sensor nodes 109, only a low data rate (throughput) needs to be sustained, because downlink transmission from the PAN coordinator 110 to sensor node 109 is used primarily to transmit minimal information for coordinating the activities of the sensor nodes (e.g. data acquisition and/or transmission scheduling, packet retransmissions, synchronization etc.), so as to reduce collisions between transmissions from multiple nodes or, more generally, to increase signal-to-noise ratio on the uplink. For example, a throughput of up to 100-200 Kbit/sec may be sufficient for these purposes. Thus, narrowband transmission, combined with an ultra-low power receiver on the sensor nodes 109 (for saving energy at the sensor nodes) is adopted. For the purposes of the present description, by "narrowband" transmission it is intended a transmission with a bandwidth significantly lower of the UWB bandwidth, of the order of e.g. 80-100 MHz or less, preferably on a carrier of few GHz, e.g. 2.4-2.5 GHz; this frequency range falls in the unlicensed spectral bands that, according to the most common regulations (e.g., ITU-R) are referred to as Instrument, Scientific and Medical (ISM) bands.

The combination of UWB transmission technique for the uplink communications, and non-UWB narrowband transmission for the downlink communications, allows overcoming the problems of robust communication between the sensor nodes and the PAN coordinators in a harsh environment and with very limited power consumption, especially at the sensor nodes.

Figure 4:
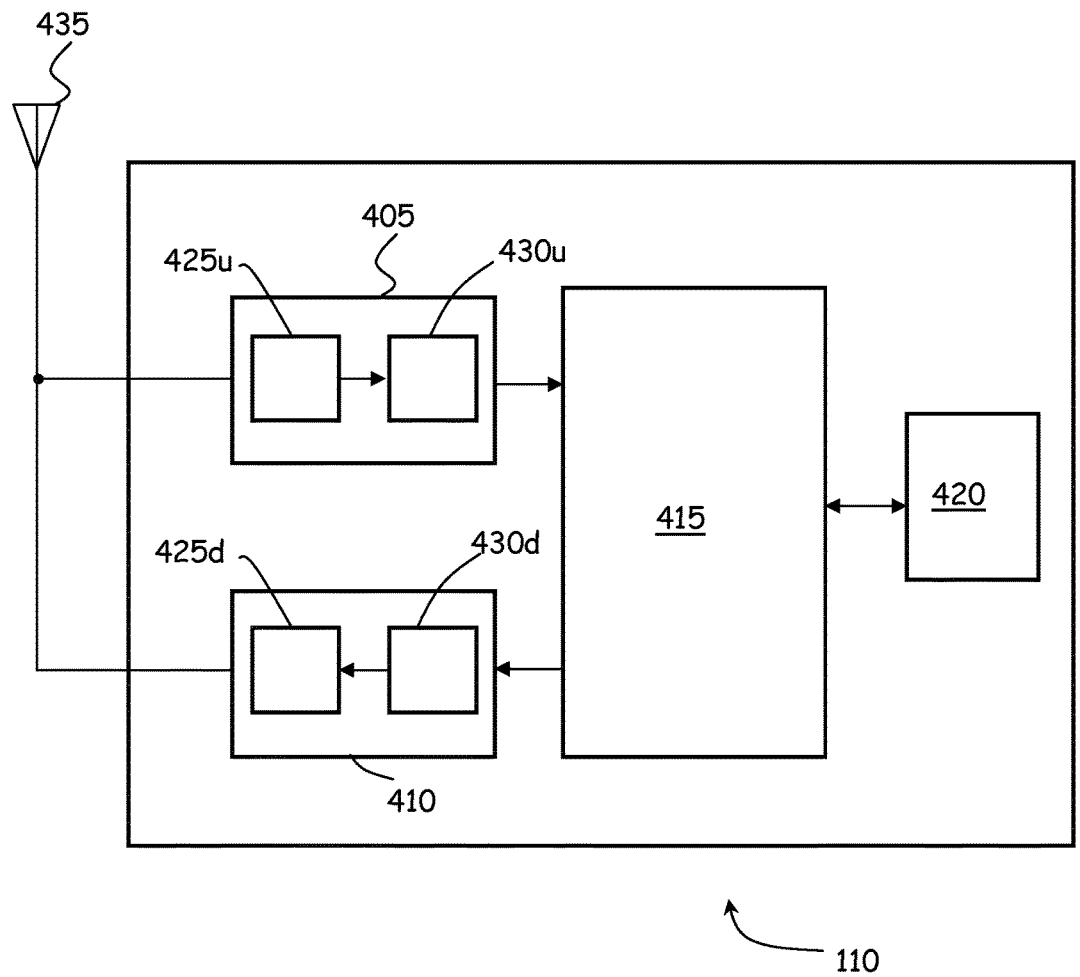
FIG. 4 is a block diagram of the architecture of an exemplary coordinator device.

A block diagram of the architecture of an exemplary PAN coordinator 110 is depicted in FIG. 4.

The PAN coordinator 110 comprises a receiving section 405, a transmitting section 410, a processing section 415, and an interface section 420 for interfacing with the system control host 115 (see FIG. 1).

The receiving section 405 is designed to have good sensitivity to capture the UWB signals transmitted by the sensor nodes in the presence of a harsh communication channel, and to be robust to in-band interference signals and maintain a relatively consistent performance. Advantageously, an energy detection-based receiver is adopted, being more sensitive to SNR than other receiver types, like correlation-based receivers (which become very unpredictable in the presence of multi-path effects, because UWB signals have a very rich multi-path profile, which makes correlation-based receivers unreliable to use).

The receiving section 405 comprises a hardware radio receiver 425u and a software driver 430u. The transmitting section 410 comprises a software driver 430d and a hardware radio transmitter 425d. According to an embodiment of the present invention, a single multiple-frequency antenna, identified with the reference 435, is coupled both to the radio receiver 425u for acting as a receiving antenna and to the radio transmitter 425d for acting as a transmitting antenna.

An architecture of the receiving section 405 of the PAN coordinator 110 is depicted in FIG. 5. The incoming signal band is first down-converted, and then energy detection is performed. The incoming signal is first split into two paths and down-converted in I (In-phase) and Q (in-Quadrature) channels. The two I and Q signal components are then filtered to remove unwanted higher-order signals. The resulting signals are squared and added to produce the final signal. This signal is an estimate of the power of the modulating signal that is not sensitive to the phase of the incoming signal. The signal is finally integrated and the output (i.e., chips) is sampled and made available to the digital baseband section for detection.

In greater detail, referring to FIG. 5, the UWB signal received from the antenna 435 is band-pass filtered in 510 and fed to an LNA 515 (or to a cascade of two or more LNAs), performing a first, low-noise signal amplification, and then it is fed to a mixer 520 that separates the signal and generates an I and a Q signal components. The I and Q signal components are each low-pass filtered in $525_I$ and $525_Q$, and then fed to respective VGAs $530_I$ and $530_Q$, whose gain is controlled by a gain and synchronization detecting module part of a baseband processing subsystem of the PAN coordinator receiving section. The amplified I and Q signal components are then fed to respective squarer circuits $535_I$ and $535_Q$, added in 540 to obtain a recombined signal 545 which is fed to an array of integrators 550, particularly four integrators in the shown example, controlled by a timing generator 555 in such a way as to perform an integration of the recombined signal 545 over partially overlapping time intervals, each corresponding to slightly more than ¼ of the chip time. The integrated values are converted into digital form by four ADCs 560, and then fed to a multiplexer 565 controlled by the gain and synchronization detecting module in the baseband processing subsystem, to select the correct ADC output.

Thanks to the fact that the integration of the received signal is performed for time windows that are much longer than the duration of the UWB pulses, the speed of the ADCs can be lowered, from the inverse of the duration of the UWB pulses to the inverse of the duration of the integration time windows; also, once a received UWB pulse is within an integration time window, the integral does not need to depend on the pulse position, but only on the fact that the pulse is contained in such a window or not.

By overlapping the different integration time windows, it is guaranteed that it always exists at least one integration window entirely containing the received UWB pulse: indeed, when the UWB pulse drifts from an integration window to another, it will cross the overlapping zone; provided that this zone is wider than the UWB pulse width, one of the two integration windows always contain the whole UWB pulse to be integrated.

A baseband processing subsystem is schematically depicted in FIG. 6. In an exemplary and non-limitative embodiment of the present invention, the data packet structure and the baseband processing are based on the IEEE 802.15.4a standard. In particular, the baseband processing subsystem essentially comprises, in addition to the gain and synchronization detecting module 605, a de-spreader 610, a packet detector 615, a header extractor 620, an ECC (Error Correction Code) decoder comprising a Reed-Solomon decoder 625 and a convolution decoder 630, and a CRC (Cyclic Redundancy Check) checker 635.

The gain and synchronization detecting module 605, using a received preamble, finds the locations of the incoming pulses to synchronize the integrators 550 in preparation for the incoming data packet. The de-spreader 610 decodes the incoming chips into bits (an 8-bit pseudo-noise sequence spreading may for example be used to combat channel effects). The packet detector 615 detects the beginning of a data packet. The header extractor 620 extracts necessary header information for the subsequent ECC decoding. The ECC decoder uses for example a Reed-Solomon coding scheme (block 625) and a half-rate convolution decoder (block 630) to further reduce error. The CRC checker 635 checks the parity check for assessing the data packet validity.

Figure 7:
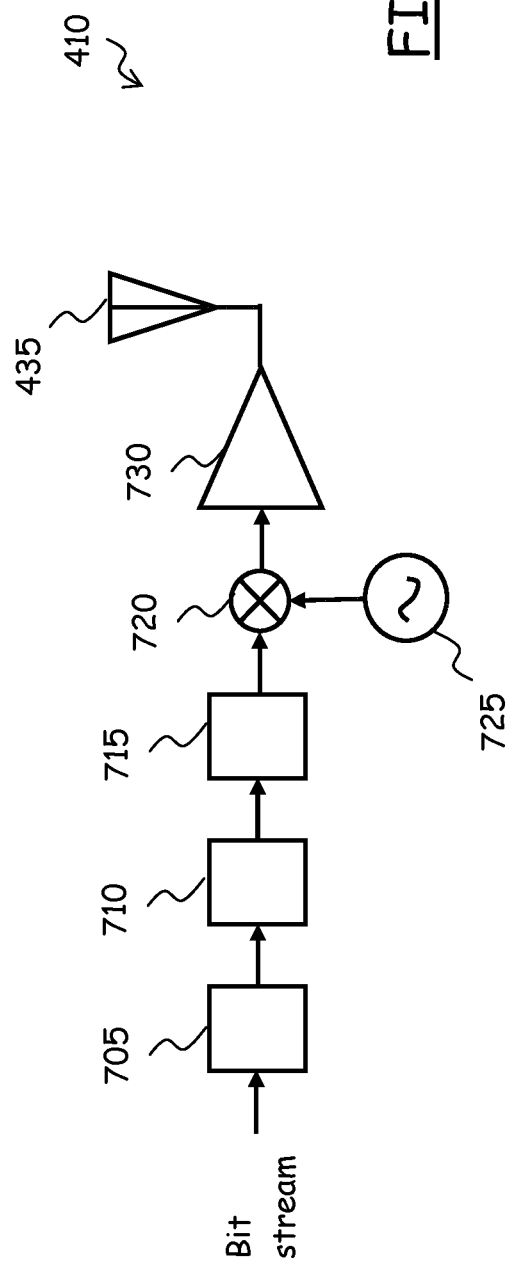
FIG. 7 is a functional block diagram of a transmitting section of the coordinator device.

A transmitting section 410 of the PAN coordinator is schematically depicted in FIG. 7; it comprises a narrowband transmitter essentially comprising a digital baseband processing module 705, a DAC 710, a low-pass filter 715, a mixer 720, a local oscillator 725 and a power amplifier 730. The bit stream to be transmitted, for example arriving at a rate between 20-200 Kbit/s, is processed by the digital baseband processing module 705, which generates a stream of digital symbols at, e.g., 80 MHz (each symbol consisting for example of an 8-bit word). The digital symbols are analog-converted by the DAC 710, and the resulting analog signal is low-pass filtered 715, for eliminating out-of-band components. Frequency up-conversion is then performed in the mixer 720 by mixing the analog signal to be transmitted with a carrier generated by the oscillator 725, for example at 2.4 GHz. The up-converted signal is then amplified in 730 and transmitted through the antenna 435.

The combination of UWB transmission technique for the uplink communications, and non-UWB, narrowband transmission for the downlink communications, with energy/envelope detection at the receivers' side, allows overcoming the problems of robust communication between the sensor nodes and the PAN coordinators in a harsh environment and with very limited power consumption, especially at the sensor nodes.

In operation, communications between the sensor nodes 105 and the PAN coordinators 110 are regulated by a MAC protocol, that manages communication medium contention between different sensor nodes 105. TDMA (Time Division Multiple Access) is preferably adopted, because it has several advantages. For example, TDMA allows the sensor nodes to transmit only during the allotted time slot and to enter a sleep mode otherwise, which helps reducing power consumption; during the assigned transmission time, the generic sensor node does not have to contend with any other sensor node for channel access, and this reduces interference and possible delay in throughput. No extra circuitry is needed, thus the energy overhead is very low.

In order to reduce power consumption at the sensor nodes, media access is controlled by sending as little information to the sensor nodes as possible. To this purpose, a MAC protocol is adopted, which is designed for ultra-low-power data-acquisition wireless networks, where the sensor nodes are subject to stringent energy constraints.

The adopted MAC scheme is an Implicitly Scheduled Time Divided-MAC (ISTD-MAC), and is a TDMA protocol that features implicit generation of a transmission schedule using an ordered priority scheme. Each node determines its own allocated time-slot based on very limited information sent by the PAN coordinator via a beacon packet. This implicit method simplifies node receiver architecture and energy consumption. The transmission priority order of the nodes can be preferably determined a-priori to save time and energy during system initialization.

An exemplary communication protocol between the nodes or sensor devices are described in the International application No. WO2009/081425, filed on 20 Dec. 2007, which is incorporated herein by reference.

Figure 8:
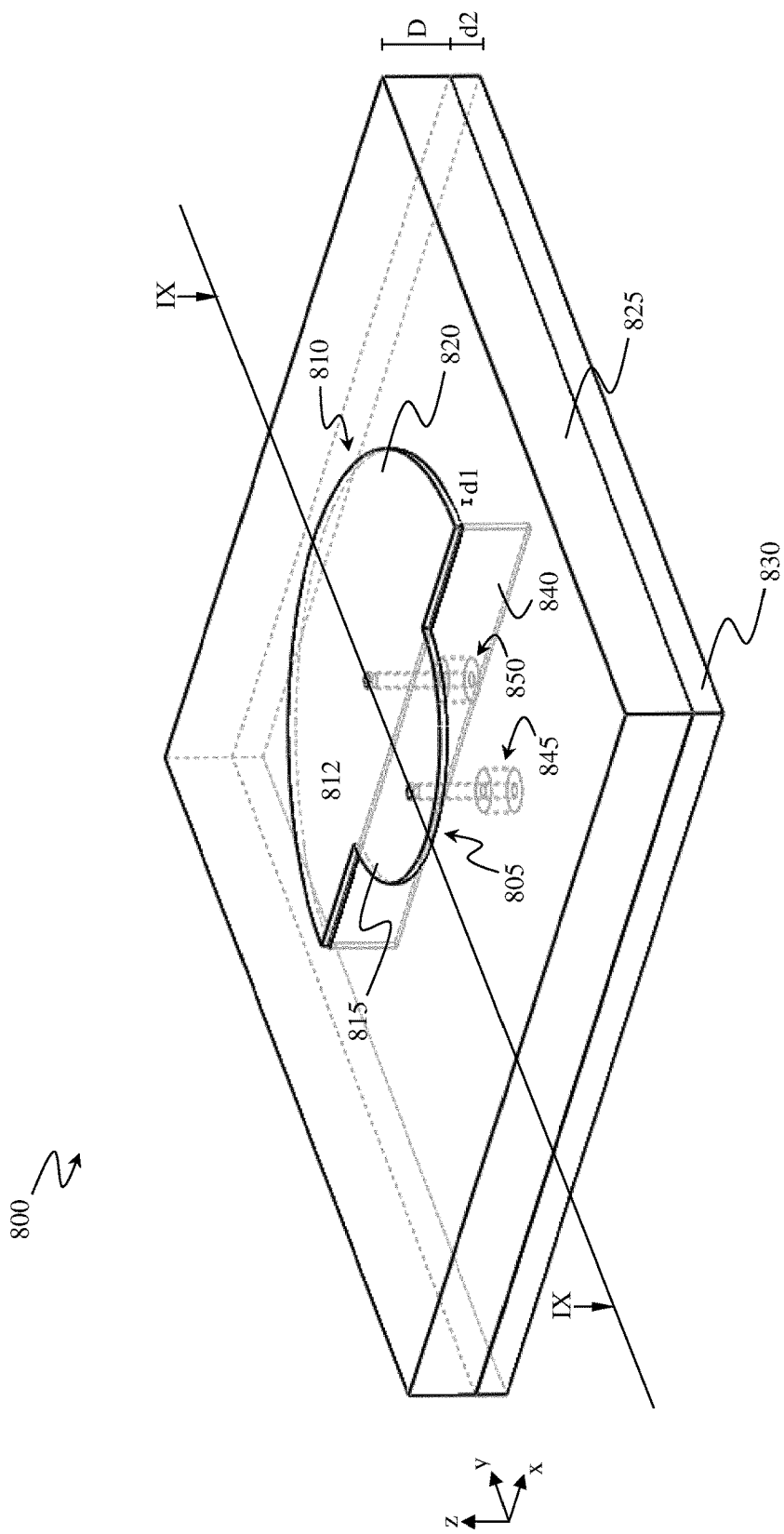
FIG. 8 is perspective view of an implementation of a multiple-frequency antenna of the coordinator device according to an embodiment of the present invention.

FIG. 8 is perspective view of an implementation—identified with the reference 800—of the multiple-frequency antenna 435 of FIG. 4 according to an embodiment of the present invention.

Figure 9:
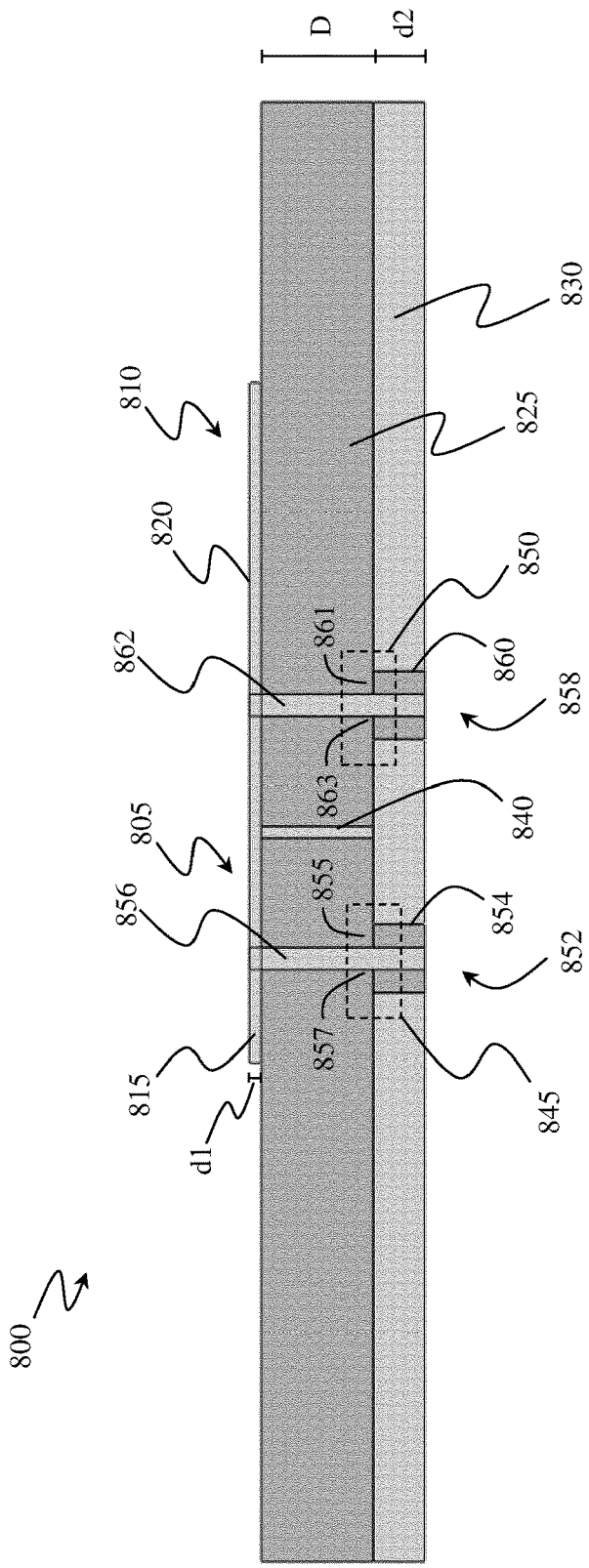
FIG. 9 is a sectional view of the antenna of FIG. 8.

Making reference to the three orthogonal directions referred to as x, y and z in FIG. 8, the multiple-frequency antenna 800 is a planar antenna substantially extending parallel to the plane defined by the directions x and y. A sectional view of the antenna 800 taken along the line IX-IX and parallel to the plane defined by the directions y and z is illustrated in FIG. 9.

The multiple-frequency antenna 800 comprises two sections, namely a first section 805 designed to operate at a first frequency range, and a second section 810 designed to operate at a second frequency range. The second frequency range is different from the first frequency range, with the highest frequency of the second frequency range that is lower than the lowest frequency of the first frequency range. For example, the first frequency range may be comprised between 2.4 and 2.5 GHz, and the second frequency range may be comprised between 4.2 and 4.8 GHz. In the embodiment of the invention illustrated in the figures, the first section 805 is coupled to the radio receiver 425u for acting as a receiving antenna, and the second section 810 is coupled to the radio transmitter 425d for acting as a transmitting antenna (see FIG. 4). However, nothing prevents from coupling the first section 805 to a radio transmitter and the second section 810 to a radio receiver in an application different from the application in a PAN coordinator of a vehicle sensor system as disclosed above; similar considerations apply in case one or both the sections 805, 810 are coupled to a respective radio transceiver.

According to an embodiment of the present invention, the multiple-frequency antenna 800 comprises a single-piece metallic plate 812 shaped so as to define a first plate portion 815 and a second plate portion 820. The first plate portion 815 corresponds to the first section 805, and thus it is designed to operate at the first frequency range. The second plate portion 820 corresponds to the second section 810, and thus it is designed to operate at the second frequency range. The thickness d1 of the metallic plate 812 is negligible compared to the wavelengths of the considered radiations, being for example equal to a millimeter fraction. The metallic plate 812 is stacked on a same layer 825 of a dielectric material, having a thickness D. Under the dielectric layer 825, there is a metallic layer 830 having a thickness d2, which acts as ground plane for the whole multiple-frequency antenna 800. According to an embodiment of the present invention (not illustrated), one or more additional dielectric layers may be further provided; for example, instead of a single dielectric layer 825, the space between the ground plane 830 and the plate 812 may be filled with a plurality of stacked dielectric layers. According to another embodiment of the present invention, the space between the ground plane 830 and the plate 812 may be left empty.

Moreover, according to an embodiment of the present invention, the first plate portion 815 and the second plate portion 820 are substantially shaped as two respective segments having facing ideal rectilinear edges and edges protruding along opposite directions. Being the first section 805 of the multiple-frequency antenna 800 configured to receive in the UWB band, and being the second section 810 of the multiple-frequency antenna 800 configured to transmit in the ISM band, the size of the first plate portion 815 is smaller than the size of the second plate portion 820.

According to an embodiment of the present invention, each plate portion 815, 820 may have a shape having curved edges, such as a circular or elliptical shape. According to other embodiments of the present invention, the plate portions 815, 820 may be shaped in different ways, such as according to a different geometric figure. For example, the plate portions may be shaped as polygons, such as trapezoids, triangles, rectangles and the like.

According to an embodiment of the present invention, the plate 812 is connected to the underlying ground plane 830 by means of a conductive grounding element 840 located at the interface between the first plate portion 815 and the second plate portion 820. In the embodiment illustrated in FIGS. 8 and 9, the grounding element 840 has the shape of a vertical wall that extends (along the direction z) from the plate 812 to the ground plane 830 through the entire thickness D of the dielectric layer 825, and which extends (along the direction x) across the width of the plate 812. Alternatively, and preferably from the constructive point of view, instead of being shaped as a vertical wall, the grounding element 840 may be formed by an array of vertical conductive pins (e.g., Vertical Interconnect Accesses, VIAS) aligned along the direction x. By observing FIGS. 8 and 9, it can be appreciated that the grounding element 840 acts as a dividing between the first section 805 and the second section 810 of the multiple-frequency antenna 800.

According to an embodiment of the present invention, the multiple-frequency antenna 800 is fed by means of coaxial cables through two feeding ports, namely a first feeding port 845 for the first section 805, which is located on a portion of the ground plane 830 located below the plate portion 815, and a second feeding port 850 for the second section 810, which is located on a portion of the ground plane 830 below the plate portion 820; in the example illustrated in FIGS. 8 and 9, the feeding ports 845 and 850 are located along the line IX-IX. More specifically, a first coaxial cable 852 has the external tubular shield 854 connected to a first terminal 855 of the feeding port 845, and the inner conductor element 856 connected to a second terminal 857 of the feeding port 845, while a second coaxial cable 858 has the external tubular shield 860 connected to a first terminal 861 of the feeding port 850, and the inner conductor element 862 connected to a second terminal 863 of the feeding port 850. The inner conductor element 856 of the first coaxial cable 852 protrudes from the level of the ground plane 830 (along the direction z) until contacting the first plate portion 815, while the inner conductor element 862 of the second coaxial cable 858 protrudes from the level of the ground plane 830 until contacting the second plate portion 820.

It has been found that the multi-frequency antenna 800 has a good efficiency and the radiation pattern thereof has a moderate directivity, allowing the antenna to exhibit a relatively high coverage angle. Moreover, the more significant part of the surface currents flowing in the first section 805 are located far from the surface currents flowing in the second section 810, advantageously reducing the coupling between the ports 845 and 850.

Moreover, all these features can be obtained with a very simplified structure, which can be easily manufactured. Particularly, both the plate portions 815 and 820 can be obtained by cutting a single metallic foil, avoiding any etching process and thus allowing the use of very cheap dielectric materials—e.g., polycarbonate—for the dielectric layer 825. However, it has to be underlined that the plate portions 815 and 820 may be manufactured separately, and then joined to each other through soldering, conductive glue and the like.

Figure 10:
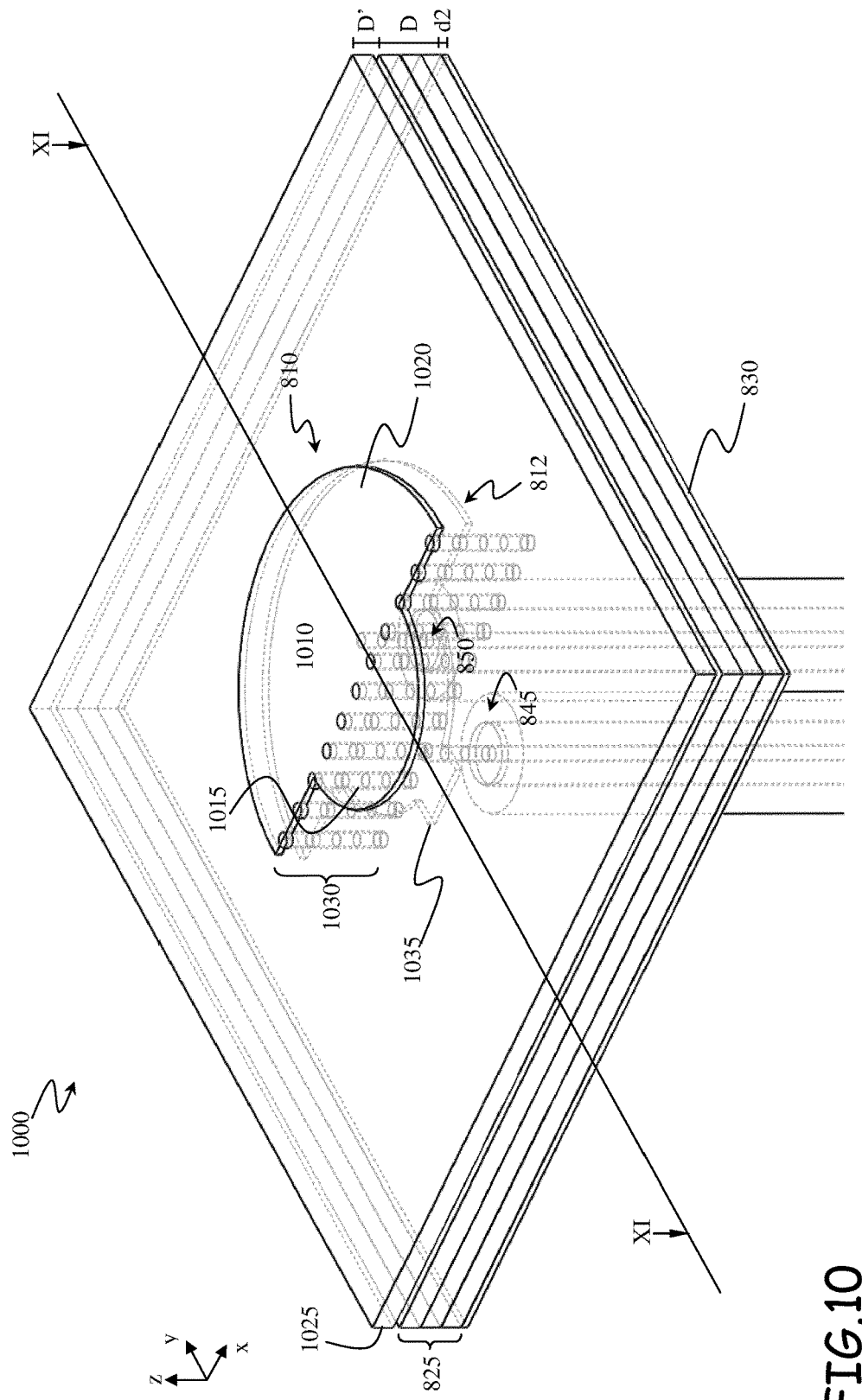
FIG. 10 is perspective view of an implementation of a multiple-frequency antenna of the coordinator device according to another embodiment of the present invention.
Figure 11:
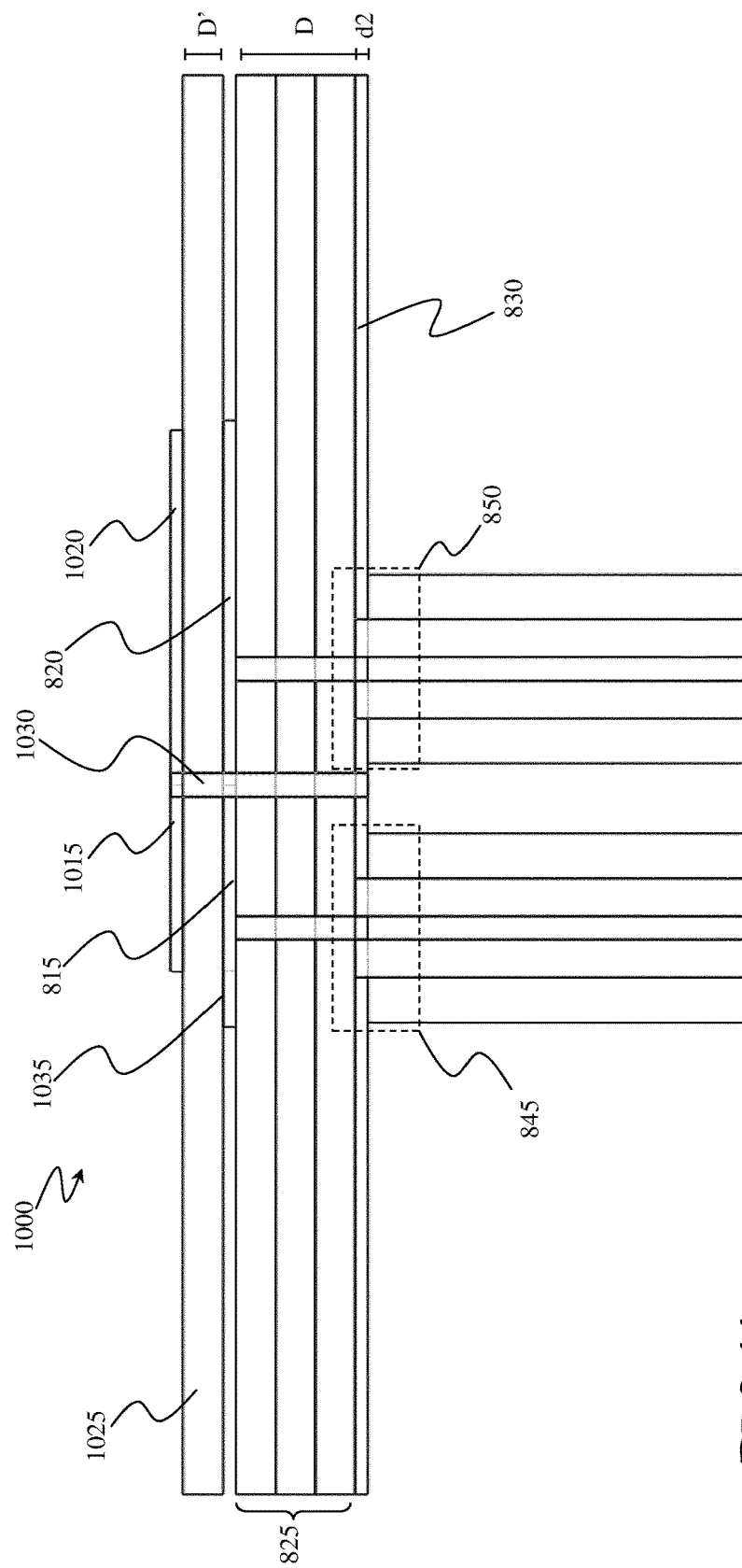
FIG. 11 is a sectional view of the antenna of FIG. 11.

FIG. 10 is a perspective view of another implementation—identified with the reference 1000—of the multiple-frequency antenna 435 of FIG. 4 according to another embodiment of the present invention. Briefly, the multiple-frequency antenna 1000 is a bandwidth-increased version of the multiple-frequency antenna 800 of FIG. 8, obtained by superimposing an additional plate 1005 above the plate 812. Since the multiple-frequency antenna 1000 is derived from the multiple-frequency antenna 800, the elements of the first antenna corresponding to elements of the second antenna will be identified in figure by the same references. A sectional view of the antenna 1000 taken along the line XI-XI and parallel to the plane defined by the directions y and z is illustrated in FIG. 11.

According to an embodiment of the present invention, the additional plate 1005 is shaped so as to define a first additional plate portion 1015 which is located above the first plate portion 815 and a second additional plate portion 1020 which is located above the second plate portion 820. The first additional plate portion 1015 and the second additional plate portion 1020 have substantially the same shape—and, possibly, substantially the same size—of the corresponding plate portions 815, 820, respectively. Both the plate portions 1015 and 1020 are stacked on a same dielectric layer 1025—having a thickness D'—covering the dielectric layer 825. In the embodiment illustrated in FIGS. 10 and 11, the dielectric layer 825 is formed by three different stacked dielectric layers. According to an embodiment of the present invention (not illustrated), one or more additional dielectric layers may be further provided; for example, the dielectric layer 1025 may be replaced by a corresponding plurality of stacked dielectric layers. According to another embodiment of the present invention, the space between the plate 812 and the additional plate 1005 may be left empty.

In a way similar to the multiple-frequency antenna 800, a vertical conductive grounding element 1030 connects the plate portions 815, 820, 1015 and 1020 to the ground plane 830 located under the dielectric layer 825; specifically, the grounding element 1030 extends along the direction z through the dielectric layer 1025 for connecting the interface between the plate portions 1015 and 1020 with the interface between the plate portions 815 and 820, and then continues through the dielectric layer 825 until contacting the ground plane 830. In this case as well, the grounding element 1030 may be a single piece having the shape of a vertical wall or—as illustrated in FIGS. 10 and 11—may include an array of vertical conductive pin elements.

According to an embodiment of the present invention illustrated in the FIGS. 10 and 11, the multiple-frequency antenna 1000 is fed by means of coaxial cables through the feeding ports 845 and 850 located below the plates 815, 820, respectively.

According to an embodiment of the present invention, the matching of the antenna 1000 can be improved by providing a stub element 1035, for example a plate element protruding from the curved edge of the plate portion 815 along the direction y.

FIGS. 12a, 12b, 13a and 13b are diagrams illustrating the radiation pattern (dBi scale) of an exemplary multi-frequency antenna structured as the multi-frequency antenna 800 of FIGS. 8 and 9 according to an embodiment of the present invention, in which:

the thickness d1 of the plate portions 815 and 820 is equal to 5 mm;
the plate portion 815 has a width equal to 20.5 mm;
the plate portion 820 has a width equal to 37.9 mm, and
the dielectric constant of the dielectric layer 825 is 2.6.

Figure 12B:
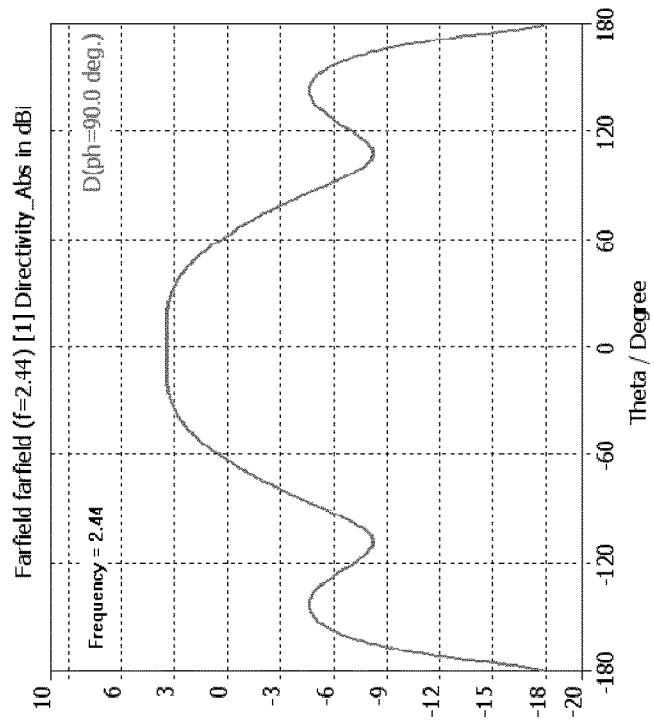
FIGS. 12a and 12b illustrate the radiation pattern of the multi-frequency antenna of FIGS. 8 and 9 when transmitting at the central frequency of the ISM band.
Figure 12A:
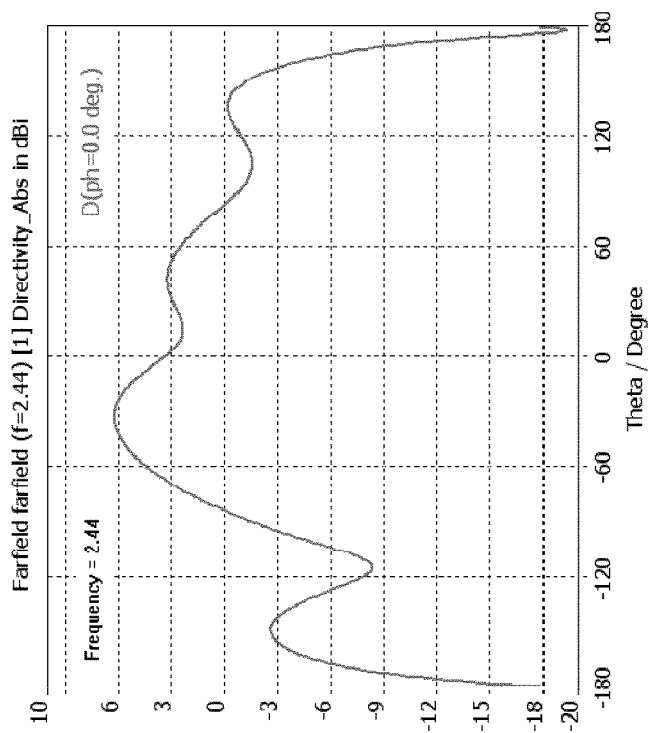
Figure 13B:
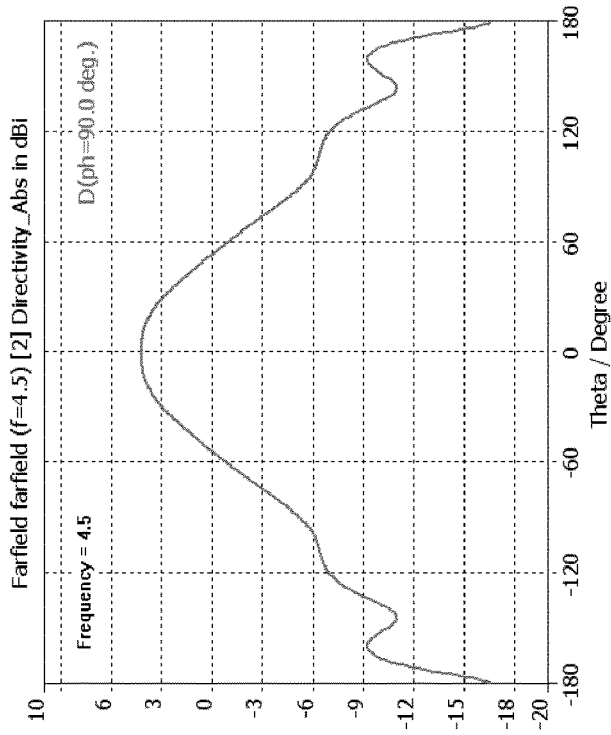
FIGS. 13a and 13b illustrate the radiation pattern of the multi-frequency antenna of FIGS. 8 and 9 when receiving at the central frequency of the UWB band.
Figure 13A:
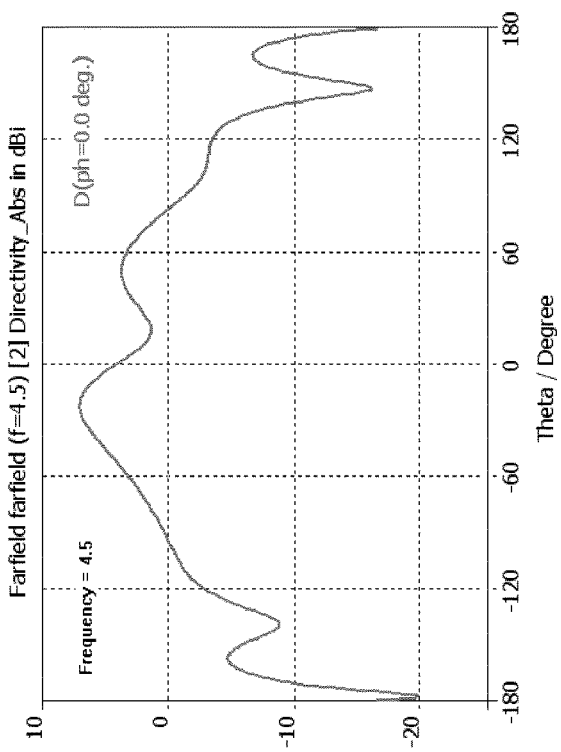

Specifically, FIGS. 12a and 12b illustrate the radiation pattern of said multi-frequency antenna 800 in the E plane and in the H plane, respectively, when transmitting at the central frequency of the ISM band (2.44 GHz), while FIGS. 13a and 13b illustrate the radiation pattern of the multi-frequency antenna 800 in the E plane and in the H plane, respectively, when receiving at the central frequency of the UWB band (4.5 GHz). The efficiency is higher than 90% (both in the ISM and UWB bands). From these diagrams, it can be observed that the maximum directivity in the ISM band is 6.3 dBi, and the maximum directivity in the UWB band is 7 dBi. The resulting coverage angle is therefore relatively high, being equal to about 130°×120° degrees in the E and H planes, respectively, at the ISM band, and equal to 130°×90° degrees in the E and H planes, respectively, at the UWB band.

FIGS. 14a, 14b, 15a and 15b are diagrams illustrating the radiation pattern (dBi scale) of an exemplary multi-frequency antenna structured as the multi-frequency antenna 1000 of FIGS. 10 and 11 according to an embodiment of the present invention.

Figure 14A:
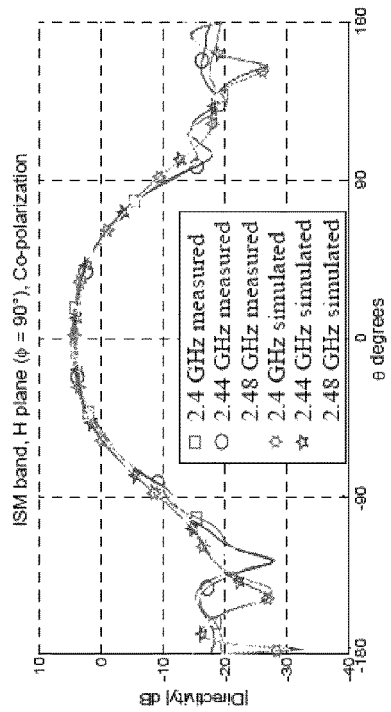
FIGS. 14a and 14b illustrate the radiation pattern of the multi-frequency antenna of FIGS. 10 and 11 when transmitting in the ISM band.
Figure 14B:
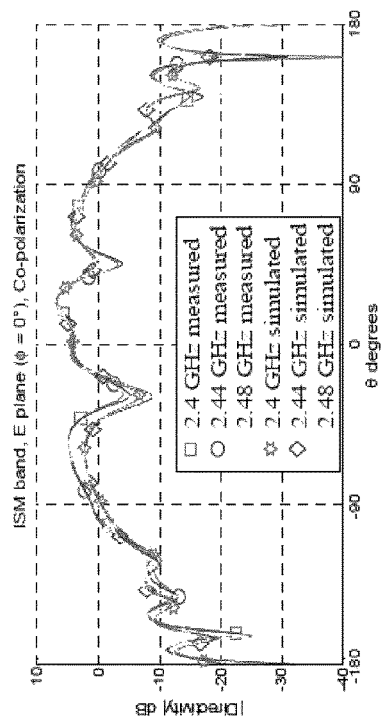
Figure 15A:
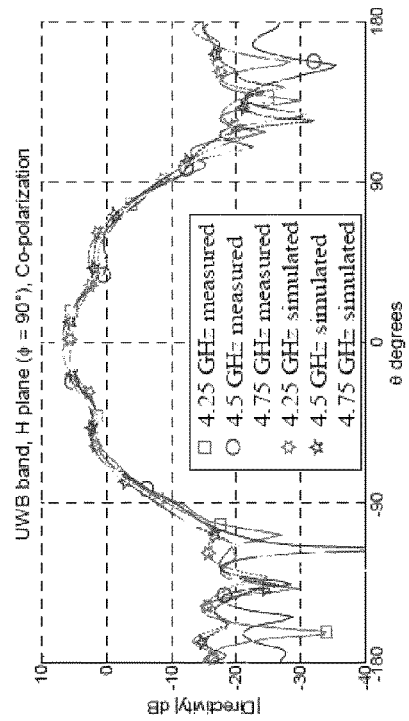
FIGS. 15a and 15b illustrate the radiation pattern of the multi-frequency antenna of FIGS. 10 and 11 when receiving in the UWB band.
Figure 15B:
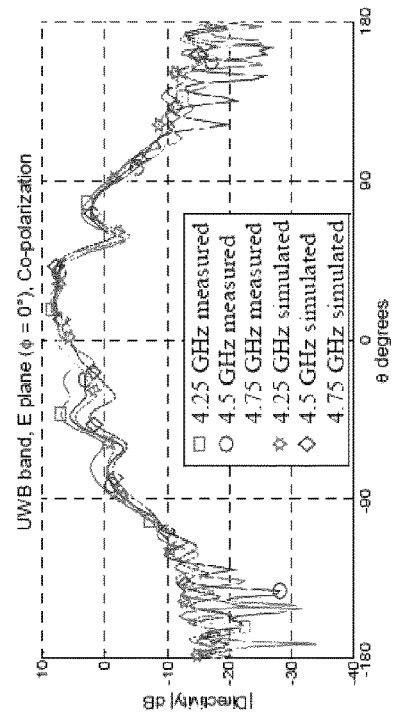

Specifically, FIGS. 14a and 14b illustrate the radiation pattern of said multi-frequency antenna 1000 in the E plane and in the H plane, respectively, when transmitting in the ISM band (at 2.4, 2.44, 2.48 GHz), while FIGS. 15a and 15b illustrates the radiation pattern of the multi-frequency antenna 1000 in the E plane and in the H plane, respectively, when receiving in the UWB band (at 4.25, 4.5 and 4.75 GHz). Compared to the multi-frequency antenna 800, the multi-frequency antenna 1200 has an increased directivity, with a maximum directivity in the ISM band that is equal to 7.3 dBi, and a maximum directivity in the UWB band that is equal to 8.3 dBi.

Figure 16:
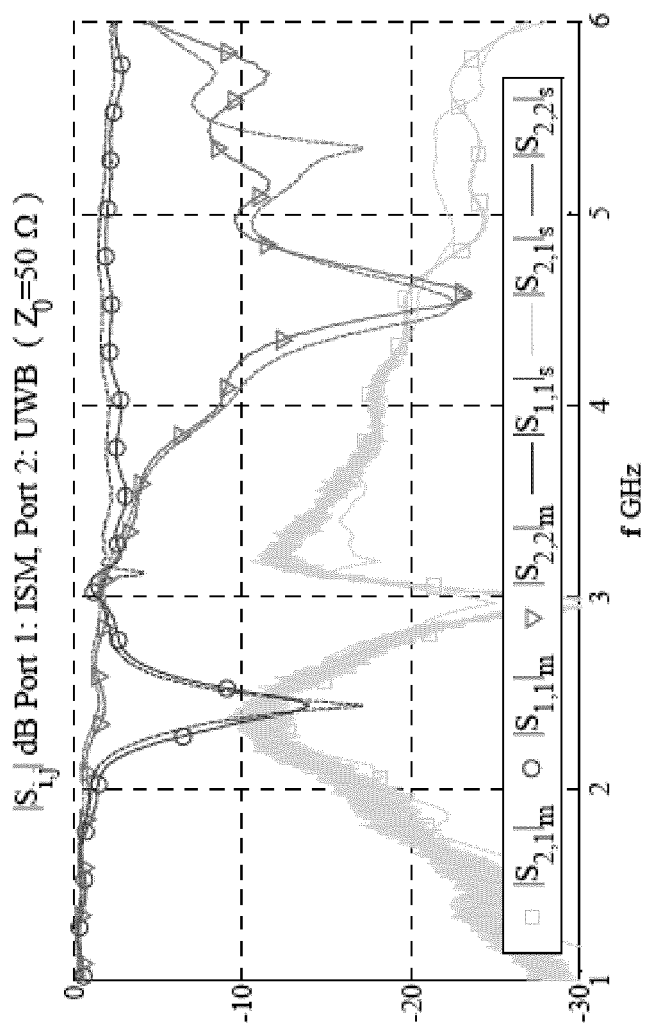
FIG. 16 is a diagram illustrating the magnitude of the scattering parameters of the antenna of FIGS. 10 and 11.

FIG. 16 is a diagram illustrating the magnitude of the scattering parameters of the antenna 1000 versus frequency. The scattering parameters $|S_{2,1}|_s$, $|S_{1,1}|_s$ and $|S_{2,2}|_s$ are obtained through a computer simulation, while the actually measured scattering parameters are identified with the references $|S_{2,1}|_m$, $|S_{1,1}|_m$ and $|S_{2,2}|_m$. As can be observed in the figure, the frequency behavior of the antenna 1000 fits the desired bandwidth requirements, both in the ISM and UWB frequency bands.

The previous description presents and discusses in detail several embodiments of the present invention; nevertheless, several changes to the described embodiments, as well as different invention embodiments are possible, without departing from the scope defined by the appended claims.

The invention claimed is:

1. A sensing system comprising a sensor device and a sensor coordinator device having an antenna, wherein the antenna comprises:
 a single-piece metallic plate including:
  a first plate portion approximating a first half circle and having a first curved edge corresponding to an arc of the first half circle, the first plate portion is configured to wirelessly receive data from the sensor device in a first frequency band; and
  a second plate portion approximating a second half circle co-planar with the first plate portion and having a second curved edge that corresponds to an arc of the second half circle, the second plate portion is configured to wirelessly transmit data to the sensor device in a second frequency band different from the first frequency band;
 a metallic ground plane common to both the first and second plate portions;
 a first feeding port connected to the first plate portion, the first feeding port being coupled to a radio receiver; and
 a second feeding port distinct from the first feeding portion and connected to the second plate portion, the second feeding port being coupled to a radio transmitter, wherein
 a size of the first plate portion is smaller than a size of the second plate portion.

2. The system of claim 1, wherein said first and second plate portions are located on a first face of a layer of dielectric material.

3. The system of claim 2, wherein the metallic ground plane is located on a second face of said layer of dielectric material opposite said first face.

4. The system of claim 3, wherein the antenna further comprises a conductive ground element configured to connect the first and second plate portions with the metallic ground plane, the conductive ground element crossing a thickness of the layer of dielectric material from the first face to the second face thereof.

5. The system of claim 2, wherein the antenna further comprises:
 a second layer of dielectric material having a first face covering the first and second plate portions and the first face of the layer of dielectric material; and
 an additional single-piece metallic plate shaped so as to define a first additional plate portion and a second additional plate portion located on a second face of the second layer of dielectric material opposite said first face of the second layer of dielectric material, so that the first additional plate portion is located above the first plate portion and the second additional plate portion is located above the second plate portion.

6. The system of claim 5, wherein said first and second additional plate portions have substantially a same shape as the first and second plate portions, respectively.

7. The system of claim 6, wherein the metallic ground plane is located on a second face of said layer of dielectric material opposite said first face; wherein the antenna further comprises a conductive ground element configured to connect the first and second plate portions with the metallic ground plane, the conductive ground element crossing a thickness of the layer of dielectric material from the first face to the second face thereof; and wherein said conductive ground element is further configured to connect the first and second additional plate portions with the metallic ground plane, the conductive ground element further crossing the thickness of the second layer of dielectric material from the first face to the second face thereof.

8. The system of claim 5, wherein said first plate portion further comprises a protruding metallic stub.

9. The system of claim 1, wherein:
 said first frequency band is centered around a central frequency between 4.2 and 4.8 GHz, and
 said second frequency band is centered around a central frequency between 2.4 and 2.5 GHz.

10. The system of claim 1, wherein a conductive ground element is connected to the single-piece metallic plate at an interface between the first and second plate portions.

* * * * *